United States Patent [19]

Kizior

[11] 4,072,609
[45] Feb. 7, 1978

[54] CAPACITANCE SYSTEM FOR HEAVY PHASE DISCHARGE OF SECOND STAGE CENTRIFUGAL SEPARATION CIRCUIT

[75] Inventor: Thaddeus Eugene Kizior, Edmonton, Canada

[73] Assignees: Her Majesty the Queen in right of Canada, as represented by the Minister of Energy, Mines and Resources, Ottawa; Her Majesty the Queen in right of the Province of Alberta, Government of the Province of Alberta, Department of Energy and Natural Resources, Alberta Syncrude Equity, Edmonton; Ontario Energy Corporation; Imperial Oil Limited, both of Toronto; Canada-Cities Service, Ltd., Calgary; Gulf Oil Canada Limited, Toronto, all of Canada

[21] Appl. No.: 767,516

[22] Filed: Feb. 10, 1977

[51] Int. Cl.² .................... B01D 17/02; B01D 33/02
[52] U.S. Cl. .................................. 210/73 R; 210/84; 210/294; 210/320
[58] Field of Search .............. 210/84, 202, 257 R, 210/259, 294, 320, 73 W, 73 R; 208/11 LE, 11 R

[56] References Cited

U.S. PATENT DOCUMENTS

| | | | |
|---|---|---|---|
| 3,446,731 | 5/1969 | Harsh | 210/73 OW |
| 3,731,802 | 5/1973 | James | 210/84 |
| 3,804,252 | 4/1974 | Rishel | 210/532 R |
| 3,846,301 | 11/1974 | Stokes et al. | 210/202 |
| 4,021,347 | 5/1977 | Teller et al. | 210/202 |

FOREIGN PATENT DOCUMENTS 16,935 of 1913 United Kingdom ................. 210/202

*Primary Examiner*—Frank A. Spear, Jr.
*Assistant Examiner*—David R. Sadowski

[57] ABSTRACT

A single capacitance vessel is provided to receive the excess heavy phase discharges (normally water) from a bank of disc-nozzle centrifugal separators. The vessel has a reservoir chamber with a weir at one end. The heavy phase streams are delivered into the reservoir of fluid retained in this chamber. In the event there are any hydrocarbons in the heavy phase fluid, the former rise to the surface of the reservoir fluid and pass over the weir, together with some water. An inert gas blanket within the vessel pressurizes the reservoir so that a fluid backpressure is maintained at the discharge outlets of the separators. By use of this system, any fluid returned from the reservoir to the separators (which occurs when the feed to the separators is low in water) is substantially free of hydrocarbons which, if present, would deleteriously affect the operation of the separators. In addition, the fluid passing over the weir is separated by a downstream weir system into hydrocarbon rich and water-rich fractions which are separately recovered.

10 Claims, 1 Drawing Figure

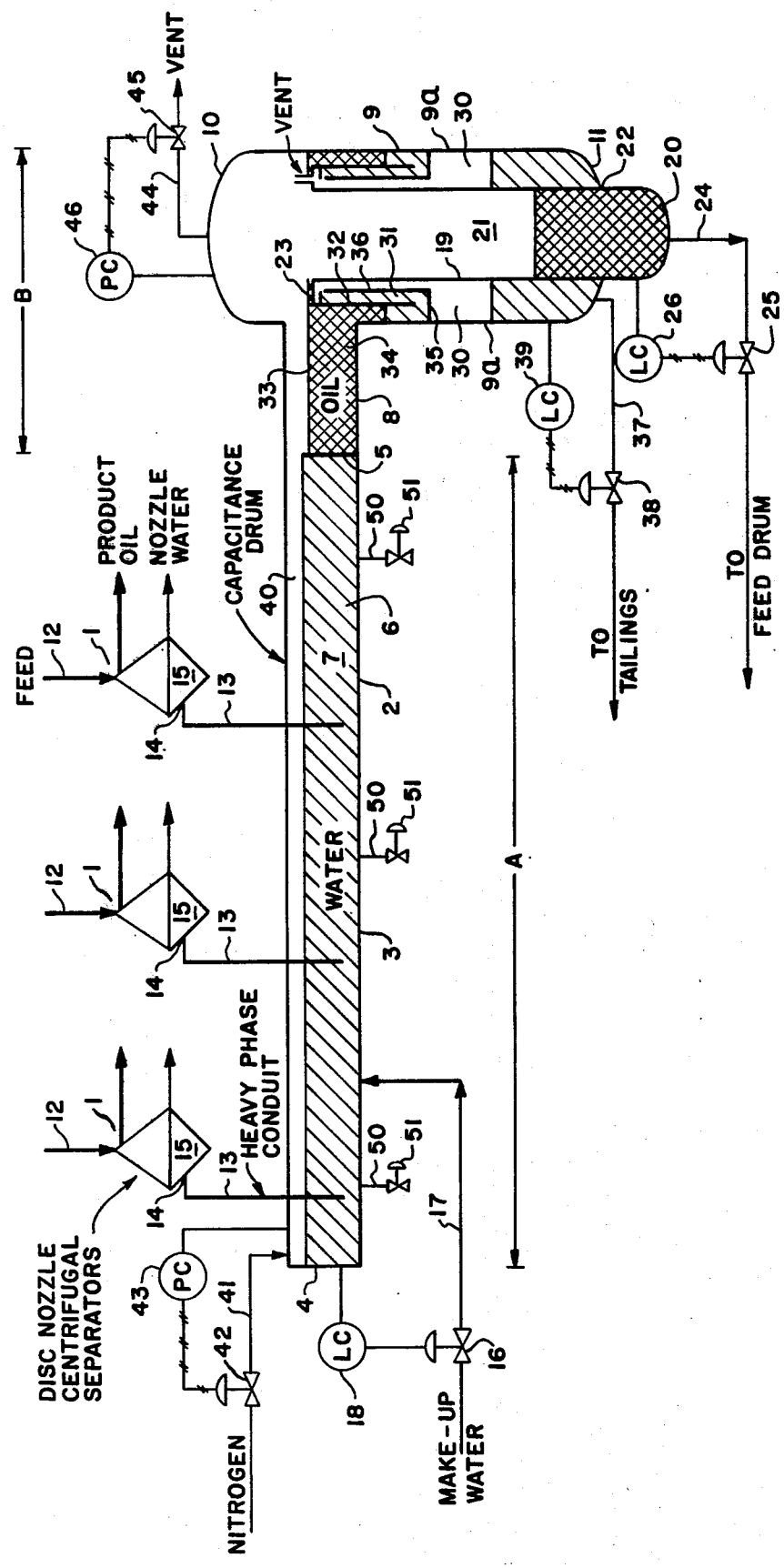

CAPACITANCE SYSTEM FOR HEAVY PHASE DISCHARGE OF SECOND STAGE CENTRIFUGAL SEPARATION CIRCUIT

BACKGROUND OF THE INVENTION

This invention is concerned with an improvement to a second stage centrifugal separator circuit for the separation of hydrocarbons from degritted, diluted bitumen froth. More particularly, the invention relates to the combination of a plurality of disc-nozzle centrifugal separators with a single capacitance vessel into which the excess heavy phase outputs of the separators discharge. Hydrocarbons, which may be present in the heavy phase streams, are separated in the vessel and a reservoir or pool of hydrocarbons-free water is maintained to supply fluid to the separators if required.

The invention has application as part of the known hot water extraction process for recovering bitumen from bituminous sands. In this process, the sands are mixed with hot water, steam and a dispersant, such as sodium hydroxide, in a rotating tumbler to heat and dilute the tar sand and initially disperse the contained bitumen. The thick slurry which is produced is further diluted with hot flood water and is then introduced into a primary separation vessel, where the bitumen, contaminated with some solids and water, forms primary froth, which is recovered. A middlings stream, containing bitumen, is withdrawn from the mid-section of the primary separation vessel and is passed through a sub-aerated secondary separation cell. Bitumen, contaminated with solids and water, is recovered in the form of secondary froth from the cell. This secondary froth is settled to remove some contaminants and is then blended with the primary froth. The combined froth is heated and deaerated and diluted with naphtha to alter the specific gravity of the bitumen. This stream is then introduced into a two stage centrifugal separation operation. In this operation, the diluted froth is first degritted by passing it through one or more scroll-type centrifugal separators to remove coarse solids. The product, comprising bitumen, fine solids and water, is then conventionally treated in a circuit comprising one or more disc-nozzle centrifugal separators to separate the water and solids from the bitumen and produce a relatively clean bitumen product.

The present invention is concerned with the excess heavy phase discharges from the disc-nozzle centrifugal separators. These separators are typically of the type sold by DeLaval Company Limited under the model designation SX320T. The degritted, diluted bitumen-containing froth feed stock to the separators typically comprises 75% by weight hydrocarbons, 4% solids and 21% water. It is fed centrally into the machine and passes through a distributor into a disc stack zone, which is whirling in conjunction with the separator bowl. Due to the action of centrifugal forces, the heavier water and solids components move from a cylindrical interface zone outwardly toward the bowl, where they form a heavy phase pool, from whence they are discharged through nozzles; the lighter hydrocarbons move inwardly from the interface zone through the disc stack to a centripetal pump means involving a light phase paring disc. This pump means forces the hydrocarbons out through a central discharge line. A second centripetal pump means, also involving a paring disc, is located at the base of the machine and communicates with the heavy phase pool. If the separator is fed froth which contains more water than is needed to satisfy the separator bowl nozzles, the excess heavy phase fluid is pumped out of the separator through a bottom outlet by the second centrifugal pump means. Under normal operating conditions, this heavy phase discharge is water; under upset conditions, however, the heavy phase discharge can comprise as much as 75% by weight hydrocarbons, 4% solids and 21% water. If the separator feed is low in water and the heavy phase pool is being depleted, water or heavy phase fluid is introduced through the heavy phase paring disc into the pool to maintain the interface zone within its normal operating region. It will be appreciated, therefore, that the position of the interface is affected by the fluid back-pressure at the outlet of the second or heavy phase centripetal pump means.

It is conventional to connect an auxilliary vessel, containing a reservoir of heavy phase fluid under pressure, with the second centripetal pump means. This vessel accepts excess heavy phase fluid from the separator and supplies same to it when the heavy phase pool is being depleted.

Heretofore, it has been the practice to provide a separate auxilliary or capacitance vessel with each separator. However, this is expensive; therefore it would be advantageous to use a single capacitance vessel with a bank of separators. However, certain problems arise when this is considered. Firstly, the separators produce excess heavy phase streams at varying rates — if the rate of discharge of one or more of the separators is low, here is a danger of plugging the capacitance vessel with deposited solids. Secondly, if the hydrocarbons — heavy phase interface within an operating separator is shifted too far toward the outside of the bowl, as can occur when a slug of high hydrocarbons content feed enters the separator, a large volume of hydrocarbons can suddenly escape into the capacitance vessel. These hydrocarbons can then back up into another separator which is taking fluid from the vessel reservoir and the interface will be "lost" in that separator as well. That is, the second separator will begin producing hydrocarbons through its bottom outlet. In this manner, by a process termed 'short-circuiting', the entire bank of separators can swiftly be rendered inoperative.

SUMMARY OF THE INVENTION

In accordance with the present invention, the heavy phase centripetal pump means of a plurality of disc-nozzle centrifugal separators are connected by conduits with a reservoir or pool of heavy phase fluid retained in a single, closed capacitance vessel. The vessel comprises two communicating sections. The reservoir is contained in a reservoir chamber formed by the exterior walls of the first section of the vessel and an interior weir extending across the open end of the section. In operation, the excess heavy phase fluid streams from the separators are transferred into the reservoir through conduits having their ends submerged therein. The transferred fluid is retained in the reservoir long enough to enable contained diluted bitumen to float to the surface. Surplus fluid, including the diluted bitumen, overflows the weir into the second section of the vessel. Here the overflowing fluid may be separated (preferably by a weir system described in detail below) into a diluted bitumen-rich fraction and a heavy phase-rich fraction, or it may simply be discharged from the vessel without undergoing separation. In the event of separation, the two fractions are recovered separately from the second section. Means for supplying make-up fluid to the reservoir are provided, to ensure sufficient fluid is available in the event the separators are being starved for fluid, due to the low heavy phase content of the feed, and a backflow from the reservoir into the separators has to be established to satisfy the needs of the separator bowl nozzles. Means, such as a blanket of pressurized inert gas, are also provided to pressurize the fluid contents of the capacitance vessel and thereby create the desired backpressure at the heavy phase outlets of the separators.

By having a single large capacitance vessel, it has been possible, in a preferred embodiment of the invention, to provide a plurality of blowdown outlets spaced along the base of the reservoir chamber. These outlets can be opened one by one to flush deposited solids out of the chamber and prevent plugging, without causing a significant change in pressure within the vessel which would deleteriously affect the position of the diluted bitumen-heavy phase interfaces in the separators.

The preferred form of the invention is characterized by a number of desirable features. Firstly, due to its relatively large size and the blowdown outlets, it is less likely to become plugged with solids when compared with the prior art scheme of providing a separate capacitance vessel for each separator. Secondly, by providing means for separating and removing diluted bitumen from the balance of the excess heavy phase fluid in the reservoir, short-circuiting of the bank of separators is reduced or eliminated. Finally, the provision of a compressible gas blanket in the vessel, coupled with the relatively large volume of the space occupied by the gas in the single vessel, permits the system to cope with surges of heavy phase in the feed stock without a significant pressure change.

Broadly stated, the invention is an improvement in a second stage centrifugal separator circuit which separates heavy phase fluid from degritted diluted bitumen froth. The improvement comprises: a plurality of disc-nozzle centrifugal separators, each separator having a heavy phase centripetal pump means, including an outlet, from removing heavy phase fluid from said separator and, in operation, a heavy-phase fluid interface whose position can be shifted by a change in the fluid pressure at the pump means outlet; a capacitance vessel comprising a first section and a second section which is an extension of the first section; a first weir extending across the interior of the capacitance vessel at the junction of the first and second sections, said first weir and first section combining to form a reservoir chamber for containing a reservoir of heavy phase fluid said first weir being operative to separate diluted bitumen from the heavy phase fluid in the reservoir chamber thereby preventing an accumulation of diluted bitumen in the reservoir chamber; means, associated with the vessel, for supplying make-up fluid to the reservoir when required; conduit means connecting the outlet of each centripetal pump means with reservoir, the end of each conduit means being submerged in the reservoir; said first weir being positioned downstream of said conduit means; means, associated with the capacitance vessel, for pressurizing its contents, to thereby maintain fluid backpressure at the centripetal pump means outlets; and means, associated with the second section, for removing fluid overflowing the first weir.

In another definition of the invention, it is a method for treating a plurality of heavy phase fluid streams produced by a plurality of disc-nozzle centrifugal separators, each having bowl nozzles and being fed degritted diluted bitumen froth comprising: transferring the streams into a reservoir of heavy phase fluid contained in a vessel; retaining transferred fluid in the reservoir to enable a portion of the diluted bitumen contained in said fluid to reach the surface of the reservoir; separating floating diluted bitumen from the reservoir and recovering it from the vessel as a separate diluted bitumen-rich product; recovering transferred fluid from the vessel as a separate diluted bitumen-poor product; and returning transferred heavy phase fluid from the reservoir to one or more of the separators when said separators require supplemental fluid to satisfy the bowl nozzles.

DESCRIPTION OF THE DRAWING

The FIGURE is a diagrammatic illustration of the preferred embodiment of the invention.

DESCRIPTION OF THE PREFERRED EMBODIMENT

The separators 1 and capacitance vessel 2 form the bulk of a second stage centrifugal separator circuit. In the FIGURE, the balance of this circuit is not shown, as it forms no part of this invention.

As shown, the capacitance vessel is formed in two sections, A and B. The downstream or second section B is an extension of the upstream or first section A. The section A is an elongate tube 3 having a closing wall 4 at one end and a first weir 5 at the opposite end. The first weir 5 extends across the interior of the section A and combines with the latter's walls to form a reservoir chamber 6 containing a reservoir 7 of heavy phase fluid. The section B comprises a tubular segment 8 which opens into a vertical, tubular segment 9 having a side wall 9a and closed ends 10, 11.

A bank of three disc-nozzle separators 1 are shown. Each separator is fed degritted bitumen froth diluted with a light hydrocarbon such as naphtha through inlet conduits 12. A conduit 13 extends from the outlet 14 of each heavy phase centripetal pump means 15 and is submerged in the reservoir 7.

In operation, heavy phase fluid, normally water, is transferred from the separators 1 into the reservoir 7. On occasion, one or more of the separators will discharge heavy phase fluid containing varying amounts of hydrocarbons, into the reservoir 7. These hydrocarbons tend to float to the surface of the reservoir and are discharged over the first weir 5 into section B. Thus the hydrocarbons are quickly cleaned out of the reservoir and the threat of backing hydrocarbons into properly operating separators is reduced.

A source (not shown) of make-up fluid supplies fluid to the reservoir 7 through valve 16 and line 17. The make-up fluid is usually water - it should be a fluid having a specific gravity close to that of the heavy phase fluid and it should be immiscible in the diluted bitumen. A suitable sensing device 18 monitors the level of fluid in the reservoir chamber 6 and opens the valve 16 in the event that the level is low. Under normal operating conditions, there will be a steady flow over the weir 5 and the make-up valve 16 will be closed.

Turning now to section B, it is shown to include means for separating diluted bitumen from the stream overflowing the first weir 5 and separately recovering same in the form of a diluted bitumen-rich fraction. More particularly, a side wall 19 and bottom wall 20 combine to form an open-topped oil chamber 21. The side wall 19 is attached to the end 11 of section B segment 9 at 22. The upper lip 23 of side wall 19 forms a second weir whose operation is described below. An outlet line 24 leads out of the bottom of the oil chamber 21 and is controlled by the valve 25 which, in turn, is controlled by a sensing device 26 responsive to the liquid level in the oil chamber 21.

An annular heavy phase chamber 30 is formed between the side walls 19 and 9a. A double weir arrangement controls admission of heavy phase fluid into chamber 30 and provides a heavy phase fluid seal 31 to prevent diluted bitumen entering therein. More particularly, a skirt 32 extends downwardly to provide a submerged weir relative to the surface 33 of the fluid in the chamber 34 (which chamber 34 is formed by the first weir 5, tubular segment 8 and skirt 32). A horizontal baffle 35 extends inwardly from side wall 9a in spaced relation below the lowermost edge of skirt 32. A weir 36 extends upwardly from baffle 35 between skirt 32 and side wall 19, however the upper edge of this weir 36 is spaced below the second weir 23.

Heavy phase fluid is withdrawn from chamber 30 through line 37 and discharged to tailings. A valve 38, operated by a sensing device 39 responsive to the fluid level in chamber 30, controls flow through the line 37.

During normal operations, the fluid level in chamber 34 will be equal to that of the weir 36 and heavy phase fluid will overflow steadily into chamber 30. In the event of a surge of diluted bitumen over the first weir 5, the heavy phase surface in the chamber 34 will be depressed (as shown in the FIGURE) and the fluid surface in chamber 34 will rise until the diluted bitumen overflows the weir 23 and discharges into chamber 21.

An inert gas blanket 40 is used to pressurize the fluid contents, to hold a fluid backpressure at the separator outlets 14. This gas is introduced into the capacitance vessel through a line 41 and valve 42. The valve is controlled by a pressure sensing device 43. A gas vent line 44, controlled by a valve 45 and pressure sensing device 46, leads out of the vessel to bleed off excessive pressure.

A plurality of blowdown lines or outlets 50 lead out of the base of the tube 3. These outlets are controlled by valves 51 and can be opened to wash out solids collected on the bottom of the reservoir chamber 6.

The tube 3 is quite large, so that plugging by a buildup of solids is reduced. The cross sectional area of tube 3 is several multiples of that of a pipe designed to just accommodate the expected maximum flow from the separators.

The embodiments of the invention in which an exclusive property or privilege is claimed are defined as follows:

1. In a second stage centrifugal separator circuit which separates heavy phase fluid from degritted diluted bitumen froth, the improvement which comprises:
   a plurality of disc-nozzle centrifugal separators, each separator having a heavy phase centripetal pump means, including an outlet, for removing heavy phase fluid from said separator and, in operation, a diluted bitumen-heavy phase fluid interface whose position can be shifted by a change in the fluid pressure at the pump means outlet;
   a capacitance vessel comprising a first section and a second section which is an extension of the first section;
   a first weir extending across the interior of the capacitance vessel at the junction of the first and second sections, said first weir and first section combining to form a reservoir chamber for containing a reservoir of heavy phase fluid, said first weir being operative to separate diluted bitumen from the heavy phase fluid in the reservoir chamber thereby preventing an accumulation of diluted bitumen in the reservoir chamber;
   means, associated with the vessel, for supplying make-up fluid to the reservoir when required;
   conduit means connecting the outlet of each centripetal pump means with the reservoir, the end of each conduit means being submerged in the reservoir;
   said first weir being positioned downstream of said conduit means;
   means, associated with the capacitance vessel, for pressurizing its contents, to thereby maintain fluid backpressure at the centripetal pump means outlets; and
   means, asociated with the second section, for removing fluid overflowing the first weir.

2. The improvement as set forth in claim 1 wherein the removing means comprises:
   means for separating diluted bitumen from the fluid overflowing the first weir, to produce a diluted bitumen-rich fraction and a diluted bitumen-poor fraction, said means being operative to segregate each fraction from the other;
   means associated with the second section for removing the diluted bitumen-rich fraction therefrom; and
   means associated with the second section for removing the diluted bitumen-poor fraction therefrom.

3. The improvement as set forth in claim 1 wherein:
   the pressurizing means comprises a blanket of pressurized inert gas within the capacitance vessel.

4. The improvement as set forth in claim 1 comprising:
   a plurality of blowdown outlets, controlled by valve means, spaced along the base of the first section, for removing settled solids from the reservoir chamber.

5. The improvement as set forth in claim 1 wherein:
   the first section has an elongate tubular horizontal form and an internal cross sectional area several multiples of that of a pipe designed to just accommodate the expected maximum flow from the centripetal pump means outlets.

6. In a second stage centrifugal; separator circuit which separates heavy phase fluid from degritted diluted bitumen froth, the improvement which comprises:
   a plurality of disc nozzle centrifugal separators, each separator having centripetal pump means, including an outlet, for removing heavy phase fluid from said separator, and, in operation, a diluted bitumen-heavy phase fluid interface whose position can be shifted by a change in the fluid pressure at the pump means outlet;
   a capacitance vessel comprising a first section and a second section which is an extension of the first section, said first section having an elongate tubular horizontal form and an internal cross sectional area several multiples of that of a pipe designed to just accommodate the expected maximum flow from the centripetal pump means outlets;
   an upstanding first weir extending across the interior of the capacitance vessel at the junction of the first and second sections, said first weir and first section combining to form a reservoir chamber for containing a reservoir of heavy phase fluid, said first weir being operative to separate diluted bitumen from the heavy phase fluid in the reservoir chamber thereby preventing an accumulation of diluted bitumen in the reservoir chamber;

means associated with the vessel, for supplying make-up fluid to the reservoir when required;

conduit means connecting the outlet of each centripetal pump means with the reservoir beneath its surface, whereby the heavy phase fluid from the outlets is distributed along the length of the reservoir;

means, associated with the capacitance vessel, for pressurizing its contents, to thereby maintain fluid backpressure at the centripetal pump means outlets;

means forming segregated first and second chambers in the second section, each said chamber having an inlet and outlet;

second weir means positioned downstream from the first weir and at the inlet to the first chamber, for separating diluted bitumen from any fluid overflowing the first weir, to produce a diluted bitumen-rich fraction which flows into the first chamber;

third weir means, positioned downstream from the first weir and at the inlet to the second chamber, operative to permit only heavy-phase product to enter said second chamber;

means for removing diluted bitumen-rich product from the outlet of the first chamber; and means for removing diluted bitumen-poor product from the outlet of the second chamber.

7. The improvement as set forth in claim 6 comprising:

a plurality of blowdown outlets, controlled by valve means, spaced along the base of the first section, for removing settled solids from the reservoir chamber.

8. The improvement as set forth in claim 6 wherein: the pressurizing means comprises a blanket of pressurized inert gas within the capacitance vessel.

9. A method for treating a plurality of heavy phase fluid streams produced by a plurality of disc-nozzle centrifugal separators, each having bowl nozzles and being fed degritted diluted bitumen froth comprising:

transferring the streams into a reservoir of heavy phase fluid contained in a vessel;

retaining transferred fluid in the reservoir to enable a portion of the diluted bitumen contained in said fluid to reach the surface of the reservoir;

separating floating diluted bitumen from the reservoir and recovering it from the vessel as a separate diluted bitumen-rich product;

recovering transferred fluid from the vessel as a separate diluted bitumen-poor product; and returning transferred heavy phase fluid from the reservoir to one or more of the separators when said separators require supplemental fluid to satisfy the bow nozzles.

10. The improvement as set forth in claim 2 comprising:

a plurality of blowdown outlets, controlled by valve means, spaced along the base of the first section, for removing settled solids from the reservoir chamber.

* * * * *